United States Patent
Ryder

(10) Patent No.: US 6,424,256 B1
(45) Date of Patent: Jul. 23, 2002

(54) METHOD AND APPARATUS FOR SEVERE BRAKING ALERT

(76) Inventor: Robert Ryder, 141-P Seminary Dr., Mill Valley, CA (US) 94941

( * ) Notice: Subject to any disclaimer, the term of this patent is extended or adjusted under 35 U.S.C. 154(b) by 0 days.

(21) Appl. No.: 09/650,112

(22) Filed: Aug. 29, 2000

(51) Int. Cl.$^7$ ................................................. B60Q 1/44
(52) U.S. Cl. ...................... 340/479; 340/464; 340/467; 340/475; 340/478
(58) Field of Search ................................. 340/479, 467, 340/464, 478, 475

(56) References Cited

U.S. PATENT DOCUMENTS

| | | | | |
|---|---|---|---|---|
| 4,265,493 A | * | 5/1981 | Ryuichi .................... 303/24 C |
| 4,491,824 A | | 1/1985 | Chiou ......................... 340/464 |
| 4,876,525 A | | 10/1989 | Gross ......................... 340/479 |
| 4,983,953 A | | 1/1991 | Page ........................... 340/467 |
| 5,043,698 A | | 8/1991 | Tabacchi .................... 340/463 |
| 5,089,805 A | | 2/1992 | Salsman ..................... 340/464 |
| 5,148,147 A | | 9/1992 | Kobres ....................... 340/463 |
| 5,172,095 A | | 12/1992 | Scott .......................... 340/464 |
| 5,298,882 A | | 3/1994 | Tsai ............................ 340/479 |
| 5,309,141 A | | 5/1994 | Mason et al. ............... 340/464 |
| 5,404,130 A | | 4/1995 | Lee et al. ................... 340/464 |
| 5,444,620 A | | 8/1995 | Yeh ............................ 340/464 |
| 5,448,456 A | | 9/1995 | Huynh et al. ............... 340/479 |
| 5,481,243 A | | 1/1996 | Lurie et al. ................. 340/479 |
| 5,499,010 A | | 3/1996 | Cohn ......................... 340/479 |
| 5,504,472 A | | 4/1996 | Wilson ....................... 340/464 |
| 5,594,416 A | | 1/1997 | Gerhaher ................... 340/464 |
| 5,606,310 A | | 2/1997 | Egger et al. ................ 340/467 |
| 5,610,578 A | | 3/1997 | Gilmore ..................... 340/463 |
| 5,642,094 A | | 6/1997 | Marcella .................... 340/463 |
| 5,652,565 A | | 7/1997 | Salcedas et al. ............ 340/467 |
| 5,656,992 A | | 8/1997 | McNeill ..................... 340/463 |
| 5,663,706 A | | 9/1997 | Francis ...................... 340/464 |
| 5,682,137 A | | 10/1997 | Li .............................. 340/467 |
| 5,717,377 A | | 2/1998 | Gao ........................... 340/467 |
| 5,786,752 A | | 7/1998 | Bucalo et al. .............. 340/469 |
| 5,786,753 A | | 7/1998 | Craig et al. ................ 340/469 |
| 5,909,173 A | * | 6/1999 | Mason et al. ............... 340/467 |
| 5,969,602 A | * | 10/1999 | Marks ........................ 340/467 |
| 6,025,775 A | * | 2/2000 | Erlandson ................... 340/436 |

* cited by examiner

*Primary Examiner*—Jeffery Hofsass
*Assistant Examiner*—Hung Nguyen
(74) *Attorney, Agent, or Firm*—Dergosits & Noah LLP; Michael E. Dergosits

(57) ABSTRACT

The present invention provides for a sensor and signal for unsafe occurrences. In the preferred embodiment, a severe braking alert system is coupled to a vehicle for notifying trailing drivers that the vehicle is braking severely. Sensors in the system detect when the vehicle exceeds a predetermined deceleration threshold value thereby causing one or more of the vehicle's existing rear lights to flash for a predetermined time period. Alternatively, a dedicated light (s) can be incorporated. The flashing light(s) alerts trailing drivers to the dangerous condition and provide them with valuable information about the vehicle's rate of deceleration. This allows the trailing drivers to apply the appropriate amount of braking power to their vehicles in order to prevent a rear-end collision. Alternative flashing schemes can also be incorporated to notify the trailing driver about the degree of severity with which the lead vehicle is decelerating.

1 Claim, 2 Drawing Sheets

METHOD AND APPARATUS FOR SEVERE BRAKING ALERT

FIELD OF THE INVENTION

The present invention relates to the field of vehicle brake lights. More particularly, the present invention relates to the field of vehicle brake lights that indicate how severely the vehicle is braking.

BACKGROUND OF THE INVENTION

Automobile and motorcycle accidents are unfortunate common occurrences on today's roads. Many of these accidents involve rear-end collisions between two cars. A primary reason for rear-end collisions is that drivers usually follow too close to the lead vehicle, not thinking about the possibility that the lead vehicle will brake severely. Therefore, when such an event does occur, trailing drivers are often taken by surprise. Furthermore, since conventional brake lights only signal when brakes are applied, trailing drivers must discern for themselves when and to what degree severe braking occurs. Therefore, by the time the trailing driver determines the rapid rate of closing between his vehicle and the lead vehicle, it may be too late to avoid a collision.

Presently, when a driver brakes severely (i.e. at a rate of 0.7 G or greater, wherein 1 G equals 1 gravity or a rate of 32.2 ft/sec/sec) the trailing driver is not immediately alerted to this valuable information. Instead, the trailing driver must first notice that the lead vehicle is braking then determine how quickly he is approaching the lead vehicle. Then, the trailing driver must determine when to apply braking and to what degree in order to maintain a safe distance. If the trailing driver does not respond to the situation quickly and appropriately, a collision will likely result. The usual sequence of events that a trailing driver in such a situation experiences is:

1. An initial delay, if the driver is not attentive to the vehicle ahead;
2. Determining the rate of approach to the vehicle ahead;
3. Determining when to brake;
4. Determining how hard to brake; and
5. Executing the braking maneuver.

This illustrates two key points. The first is that it takes precious time to process through these steps, even if the processing is done unconsciously. The second is that steps 2, 3, and 4 are subject to errors in discernment and judgment. These delays and errors contribute to the possibility of a rear end collision. If there were fewer steps to process through, it would be easier for a driver to appropriately react to such a situation.

Further compounding the problem is a reduction in a person's ability to discern and appropriately react to an emergency as the person becomes older. Therefore, as the average age of drivers increases, severe braking becomes a greater hazard.

Presently, vehicles are equipped with standard rear lights which include the following:

1. A Rear Center Safety Light—On the rear of all post-1986 vehicles is a single filament bulb behind a red lens which illuminates only when the brakes are applied.
2. Red Night Tail Lights and Brake Lights—On each rear side of vehicles is a tail night light and a brake light, both of which function with the same two filament bulb. One filament illuminates to become the night light and the other filament illuminates when the brakes are applied. The bulbs are behind red lenses. On some vehicles, instead of using two filament bulbs, separate bulbs are used.
3. Amber Turn Signal Lights—On each rear side of vehicles is a single filament bulb which flashes when the corresponding turn signal is activated. The bulbs are behind amber lenses.
4. Amber Emergency ("Hazard") Lights—When the emergency switch is activated both turn signal lights flash simultaneously behind amber lenses. On some vehicles, the brake lights or red tail lights flash when the emergency switch is activated.
5. White Reverse Gear Light—On each rear side of the vehicle is a single filament bulb behind a clear or opaque lens. The bulb is illuminated when the vehicle is placed in reverse.

Unfortunately, none of these lights, nor their operation, inform a trailing driver that a lead driver is braking severely and to what degree. Those determinations must still be made empirically by the trailing drivers. What is needed is a system that will alert trailing drivers to the fact that the lead vehicle is braking severely. What is further needed is a system that will alert trailing drivers to the degree of braking by the lead vehicle.

SUMMARY OF THE INVENTION

The present invention provides an alert system coupled to a vehicle for notifying trailing drivers that the vehicle may have experienced an unsafe occurrence. The alert system comprises an alert sensor for detecting the physical conditions associated with the unsafe occurrence and a signaling device coupled to and activated by the sensor for automatically signaling trailing drivers when the vehicle has experienced an unsafe occurrence.

In one particularly preferred embodiment, the alert system employs a deceleration sensor for detecting physical conditions associated with rapid deceleration of the vehicle. In another embodiment, the alert system can be used to alert trailing drivers that the lead driver is rapidly decelerating.

In another embodiment, the alert system can be used as an anti-theft system, even in situations involving carjacking.

DETAILED DESCRIPTION OF THE PREFERRED EMBODIMENT

Figure 1:
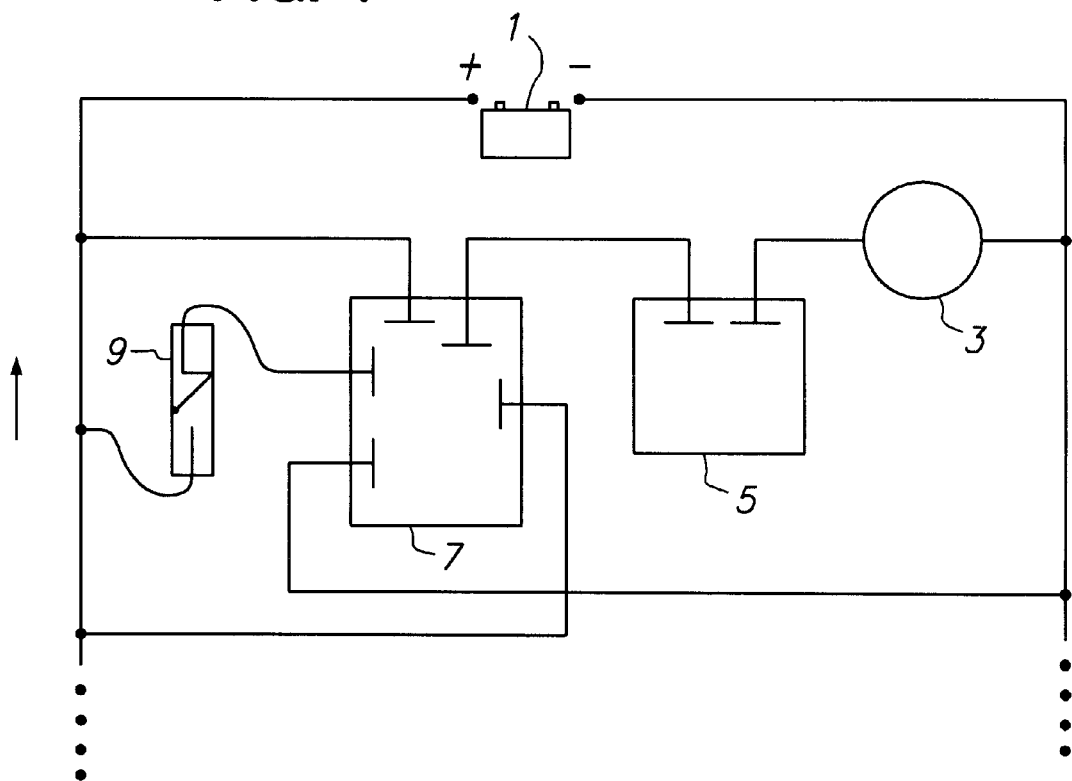
FIG. 1 illustrates an example block diagram of the circuit for implementing the present invention.

The present invention provides for an alert system coupled to a vehicle for automatically alerting trailing drivers that the vehicle has experienced an unsafe condition. By vehicle, it is meant to include not only automobiles such as cars, trucks, vans, and sport utility vehicles, but also motorcycles, mopeds, and any other motorized vehicle. The unsafe occurrence includes, but is not limited to, rapid deceleration caused, for example, by braking severely; having the vehicle's anti-lock braking system (ABS) issue a correction command when the vehicle's wheels are about to lock up; and having the vehicle's traction control system issue a correction command to reduce engine power and/or apply brakes to the driving wheels when the vehicle is losing traction. Reducing engine power can be accomplished by adjusting the throttle and ignition timing as well as by cutting off the fuel injection and ignition. By automatic, it is meant that the lead driver does not have to activate the present invention. Instead, the present invention detects the unsafe condition and "automatically" alerts (signals) trailing drivers.

In the preferred embodiment the alert sensor is a severe braking sensor that senses when a vehicle is braking severely and alerts trailing drivers of this activity. Although any number of different methods can be incorporated to alert trailing drivers, perhaps the easiest is to flash one or more of the vehicle's existing rear lights or to add a dedicated light. For example, the rear lights may blink a predetermined number of times per second. Furthermore, the lights may be designed to flash slowly to correspond to moderate braking and quickly for severe braking. Still further, a light fixture dynamically displaying particular numerical deceleration rates may be displayed. Still further, lights of different colors may be displayed wherein particular colors indicate a moderate deceleration rate while other colors indicated a rapid deceleration rate. By alerting trailing driver's that a lead vehicle is braking severely, collisions can be avoided and lives saved.

A major advantage of the present invention is that the flashing light(s) attract the attention of trailing drivers even if they are distracted or not paying attention to the lead vehicle. The flashing lights are especially effective at drawing a viewer's attention even if only seen with their peripheral vision. This minimizes any initial delay in reacting to such emergency situations.

The present invention detects a severe braking condition by measuring the deceleration of the vehicle and activating the rear lights when the deceleration rate exceeds a threshold rate. It should be noted, however, that for purposes of this application, merely applying the vehicle's brakes is not considered an unsafe occurrence. It is when the brakes are applied to such a degree that the vehicle decelerates at a rate beyond a predetermined threshold that it is considered an unsafe occurrence. Although the particular deceleration threshold rate can be adjusted according to safety studies and government regulations, the present invention contemplates a deceleration threshold of between 0.2 G and 1.2 G in a horizontal plane. Wherein 1 G, for example, is equivalent to a deceleration rate of 32.2 ft/sec/sec which is equivalent to having an object traveling 21.8 miles per hour come to a stop in one second; or an object traveling 43.6 miles per hour come to a stop in 2 seconds.

While the present invention will be described in detail by way of illustration and example, for purposes of clarity of understanding, it will be understood by those skilled in the art that certain changes and modifications may be made to the described embodiments without departing from the spirit of the invention and scope of the appended claims.

Turning now to the figures, FIG. 1 illustrates a block diagram of the basic elements of the present invention. This includes a battery 1, a deceleration threshold detection switch 9, a time delay relay 7, a flasher unit 5, and a bulb filament 3. Except for the bulb filament 3 and the wires to the bulb filament 3, it is contemplated that the entire circuit be packaged in a small container for easy installation in a vehicle.

The circuit of FIG. 1 operates by detecting deceleration of the vehicle equal to or greater than a predetermined threshold. This results in switch 9 closing, thereby allowing current flow which activates the time delay relay 7 and powers the load consisting of the flasher unit 5 and the bulb filament 3. Battery 1, can be a dedicated battery or the conventional vehicle battery. If desired, the circuit can be powered with two batteries of different voltages wherein one supplies power through the inertia switch 9 to the time delay relay 7. The second battery can power the load consisting of the flasher unit 5 and the bulb filament 3.

As discussed above, many different signaling methods can be incorporated to alert trailing drivers that the lead vehicle is braking severely. According to the preferred embodiment of the present invention, the rear center safety light flashes in a predetermined sequence.

A simple method for configuring the rear center safety light to flash in a predetermined sequence is to use a two filament bulb in place of the existing single filament bulb that is positioned behind the red lens in the rear center safety light fixture. One filament can illuminate when the brakes are applied and the other filament can flash to signal severe braking above the designated deceleration threshold. The bulb base can have four contacts, two of which lead to and from the flashing filament. The severe braking signal can also incorporate non-flashing lights of a unique color or other flashing lights, in which case they would take the place of the bulb filament 3 in the circuit.

Alternatively, the existing rear center safety light can be configured to flash when the vehicle is braking severely. For example, the present invention can incorporate a double pole double throw (DPDT) switch after the inertial switch. The DPDT switch could be connected to a circuit for the rear center light. For this circuit, the DPDT switch would be in the normally closed position when the inertial switch is not activated and would be open when the switch is activated. The DPDT switch would also be connected to the severe braking alert circuit and for this circuit, would be in the normally open position and would close when the inertial switch is activated. Consequently, when the inertial switch is activated the rear center light would flash due to the severe braking alert ("SBA") circuitry and the rear center brake light circuit would be inactivated.

This same basic approach can be used to flash the other two existing brake lights so that all three lights flash when the inertial switch is activated.

The flasher unit 5 provides the current to the bulb filament 3 in order to flash the bulb filament 3. The flasher unit 5 can be programmed for any desired flashing rate. Alternatively, the flasher unit 5 can be eliminated if the braking alert is a non-flashing signal. An example flasher unit is flasher model S312 manufactured by SSAC Inc. (Baldwinsville, N.Y.).

The time delay relay 7 enables the flashing light to continue flashing for a predetermined time period (i.e. 3 seconds) after the deceleration threshold is no longer exceeded. Model HRD9 manufactured by SSAC Inc. is an example of a time delay relay for incorporation with the present invention. The time delay relay 7 can be eliminated altogether if flashing is only desired while the threshold braking level is exceeded.

In addition to increasing the chances of the flashing alert being noticed, flashing the light for a short period after the threshold is no longer exceeded also serves as a cautionary reminder to trailing drivers. It indicates that:

1. The lead driver may have cause to again brake severely at any moment.

2. The lead driver may still be braking heavily but just below the threshold level.
3. As the trailing driver, you may be approaching a stationery object or debris in the roadway that caused the lead driver to brake.

The threshold deceleration detection switch 9 closes and activates the circuit of the present invention when it detects that the predetermined threshold deceleration rate has been exceeded.

The present invention contemplates, although is not limited to, three basic types of switches for detecting the deceleration rate of a vehicle. These three methods are Inertial, Rate of Change of Rotations Per Minute (RPM), and Downward Braking Force on the Wheels.

The first method incorporates an inertial device for measuring the inertial forces of the vehicle. Example inertial devices include inertial sensors, shock sensors, motion sensors, impact switches, decelerometers, accelerometers, acceleration sensitive devices, and fluid inertia devices. The two principal types of inertial switches are the spring mass type and the magnetic type.

The second method for detecting the vehicle's deceleration rate analyzes the RPM of one or more of the vehicle's wheels. The RPM can be fed to a processor as an alternating current sine wave, with each cycle of the wave representing a revolution. The same technology used in anti-lock braking systems could be used. The processor converts the RPM into distance traveled per unit of time (i.e. velocity). By determining the negative rate of change of the vehicle's velocity (i.e. deceleration), the threshold deceleration rate can be detected. Once the deceleration threshold is exceeded, a relay is tripped thereby activating the severe braking alert. The processor determines the deceleration rate by taking the derivative of velocity with respect to time. Continual monitoring of the deceleration rate by the processor provides an output voltage that controls a light scale for signaling the magnitude of the deceleration rate to trailing drivers. The technology for continually monitoring the deceleration rate exists in the microprocessor computer called the Electronic Brake Control Module (EBCM) used in Anti-lock Braking Systems to prevent wheel lock-up.

The third method for detecting the vehicle's deceleration rate measures the downward braking force on the wheels. When a vehicle decelerates, the force on the front wheels increases and the force on the rear wheels decreases. This compresses the front springs and extends the rear springs. A certain force on the springs represents the threshold braking level, so that when that force is exceeded, the severe braking alert will be activated.

It can readily be shown, for example, that a vehicle weighing 2,400 pounds, with a 10 foot wheelbase and a center of mass that is half-way between the front and rear axles and 3 feet above ground, that is stopping in 6 seconds from a speed of 60 miles per hour will have a force of 1,530 pounds exerted on the front wheels and 870 pounds exerted on the rear wheels.

The severe braking alert could be made to activate when the threshold force was exceeded at the front wheels. Other things could be done to prevent spurious activation. The circuitry could be constructed so that activation would only occur when the threshold force occurred on the front wheels as well as when: a) the brakes are applied, b) the rear springs are in extension, or c) both "a" and "b" occur.

As the passenger or cargo loading changes in a vehicle, the mass and center of mass also changes. This in turn causes the threshold force to change. It is assumed that when vehicles utilize this approach, the change in the threshold deceleration will not be significant and the selected threshold level will be conservative enough to allow for some change in the vehicle's mass and center of mass.

It is also contemplated that load cells be used to measure the increased downward force of the vehicle due to braking. For each front wheel, a load cell could be positioned at the base of the spring and shock absorber to sense the braking forces when the vehicle is braking and the weight that the coil and spring support when the vehicle is stationary. A load cell such as model ELF-1000-2500 could be used for this purpose with a meter MM45-HL-15, both made by the Entran Corp. (Fairfield, N.J.). The meter serves as a power supply for the cell and displays the force measured. The meter is also equipped with a trip switch for activating the severe braking alert circuit when the threshold force is reached. The output voltage of the load cell changes as the force on it changes. This voltage can also be used to control a light scale that signals to trailing drivers the magnitude of the deceleration rate.

Each load cell can have its own meter or one meter can be used for two cells so that the one meter responds to the cell with the greatest reading. Alternatively, only one load cell can be used. However, this will not take into account centrifugal force when the cell is positioned by the inside wheel during a braking turn. The same load cell approach can be used for the rear wheels, except that in this case the cells would detect a reduction in force.

The displacement or compression distance of the vehicle's coil and shock, caused by downward braking force, can also be used to detect the rate of deceleration. To do so, the deceleration rates are equated to downward braking forces through computation or actual measurement. The downward braking forces are then equated to displacement distances. The displacement distance corresponding to the threshold deceleration rate can be detected by a linear displacement transducer such as model DTI 83743 and a signal processor equipped with a threshold trip relay such as model DT813748, both made by Data Instruments (Acton, Mass.). The output from the signal processor can also be used to control a light scale that signals to trailing drivers the magnitude of the deceleration rate. Linear voltage differential transducers or similar devices can also be used for this purpose.

During braking, the force exerted on the road by the front wheels will be different than the sum of the forces exerted on the front end suspension system. This is due to the differences in mass involved and can be taken into account when computing downward braking forces by one skilled in the relevant art.

Other means for detecting the displacement distance include proximity sensors such as sensor model 972AA2XM-A3N-1 by Honeywell (Freeport, Ill.) and a coil relay switch. The sensor would be fastened to a non-suspended part of the vehicle so that when the threshold displacement distance is reached, the sensor will detect a suspended portion of the vehicle within its proximity range, thereby triggering the sensor. Any type of simple contact switch can also be used so that when the displacement distance is reached, two contacts touch one another. In the case of the contact switch and the proximity switch, their positioning can be such that they will not be damaged when the displacement distance is exceeded.

A potential drawback to using the displacement distance to detect the threshold rate is that the shock absorbers will slow the descent of the front end upon braking and, therefore, it will take longer to reach the maximum displacement distance. Consequently, the alert signal is likely to be given slightly later than when the threshold rate is detected by other means. Also, worn shock absorbers would result in a greater displacement than new ones, since they offer less resistance. These factors can be accounted for, however, and designed around by one skilled in the art.

For illustrative purposes, according to a preferred embodiment, the present invention utilizes an inertial or impact switch of the magnetic restraint or spring mass type. A unidirectional inertial switch Model 6UO-627 manufactured by Inertia Switch Inc. (West Nyack, N.Y.) is an example of such an inertial switch.

The unidirectional inertial switch can be installed so that the long dimension is parallel to the front to rear axis of the vehicle. This enables the switch 9 to sense the maximum deceleration force when the vehicle brakes while traveling along a straight and level road. Under these conditions the switch 9 will also function without being affected by gravity, except for the friction between the small mass and the casing.

A conventional unidirectional inertia switch is basically a small mass, such as a tiny steel ball, that pushes along the unidirectional axis against a spring or magnetic resistance. During deceleration the switch will activate at a lower deceleration rate when traveling downhill, in comparison to traveling on level ground, and at a greater deceleration rate when traveling uphill. This is because when traveling on an incline, the gravity force on the switch mass comes more into play since now there is a component of gravity force along the directional axis of the switch 9.

Nevertheless, the activation of the switch at a lower deceleration rate is desirable when traveling downhill. A vehicle has more inertia going downhill and is more precarious since it is more difficult to stop. Therefore, the earlier triggering of the switch can be thought of as a safety compensating factor.

Similarly, a vehicle has less inertia when traveling uphill and is less precarious since it is easier to stop. Here again, the later triggering of the switch can be viewed as a compensating factor. However, if it is considered important for the switch to activate at the same rate of deceleration regardless of whether the vehicle is traveling on level ground, downhill or uphill, this can be accomplished by using a leveling device to keep the switch level along the front to rear axis of the vehicle.

When a vehicle brakes while traveling in a curve, the maximum deceleration force or the resultant force of deceleration will not be along the front to rear axis but will be at an angle to that axis, due to centrifugal force. However, curved roads are usually banked so that when traveling at normal speeds, the resultant of the centrifugal force and gravity will be a force almost perpendicular to the road. Therefore, it may not be warranted to consider centrifugal force for purposes of the severe braking alert.

However, if it is decided, to further account for centrifugal force, the present invention contemplates four basic methods for detecting the maximum or near maximum deceleration force when a vehicle brakes in a curve. These four methods include:

1. Three or more unidirectional inertia switches can be incorporated in the circuit of the present invention so that the circuit is activated when any one of these switches closes. One of the switches can be oriented parallel to the front to rear axis with the other two switches angled away from the front to rear axis on each side of the axis along directions where maximum deceleration forces are most likely to occur. Although the actual deceleration forces may not be in exact alignment with the orientation of the switches when the vehicle brakes in a turn, this is still an excellent approach.

2. A conventional radial inertia switch sensitive to forces in all directions in the radial plane can also be incorporated into the circuit of the present invention.

3. A unidirectional inertia switch that swings 180 degrees or less from one end (or from an extension to the end) is proposed that is housed in an enclosure and mounted to the vehicle and in a plane horizontal to the vehicle or roadway. A major advantage of this device is that it uses a unidirectional switch, which is the most accurate type of switch and converts it into a radial switch.

During braking the switch will point forward in the direction of the maximum deceleration force in its swinging plane and when that force exceeds the threshold level, the switch will close and activate the circuit. Although the centrifugal force may not be exactly in the plane parallel to the road, we are interested in the component of force in this plane since this is the force that causes vehicles to skid or go out of control.

4. This proposal consists of a unidirectional inertia switch hung from one end (or from an extension to the end) from a point analogous to the center of a small sphere so that the switch is free to swing, much like a pendulum, within the lower front (of vehicle) quadrant of that sphere. The swinging switch is in a quadrant enclosure mounted in a vehicle with the top flat surface horizontal to the vehicle or roadway. Once the threshold level is determined for a given plane in the swing of the switch, the position of the switch and the corresponding G force can be calculated using the appropriate statics equations known by one skilled in the art.

For example, if it is assumed that the threshold level is 1 G in a horizontal plane, it can be shown that when this condition occurs, the switch will swing to a 45 degree angle from the vertical and the force upon it will be 1.414 G. In this case the switch would be rated for activation or closing at 1.4 G and the system would account for the horizontal component of centrifugal force, which is a reasonable approximation of the component of centrifugal force parallel to the roadway.

Variations of the last two primary methods for detecting deceleration threshold levels include:

a. Devices that cause switch closure when the threshold deceleration force causes a weight to move, lift off a surface, or touch a surface;

b. Devices that employ springs or elastic bands that extend a given distance to touch a surface or exert a force that causes a switch closure when a threshold deceleration force occurs; and c. Devices that cause switch closure when a pivoted arm rises to form a given angle with the vertical when a threshold deceleration force occurs.

Figure 2:
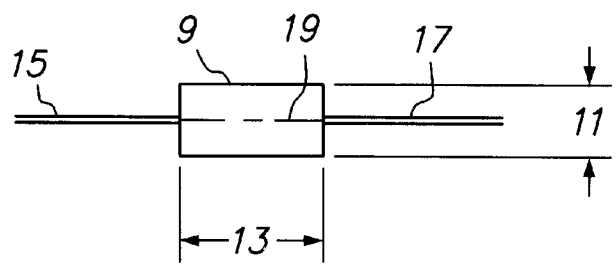
FIG. 2 illustrates a conventional inertial switch of the spring mass or magnetic restraint type.

Returning to the figures, FIG. 2 illustrates a typical small inertia switch 9 having a canister shape with a diameter 11 of 0.25 inches and a length 13 of 0.50 inches. The input wire 15 and output wire 17 are also shown. If, for example, the switch 9 is rated to close at 1 G, then when it experiences a 1 G force along its axis 19, which is also along the vehicle's direction of travel, the switch 9 will close and the circuit will be activated. Other types of switches can also be incorporated.

Figure 3:
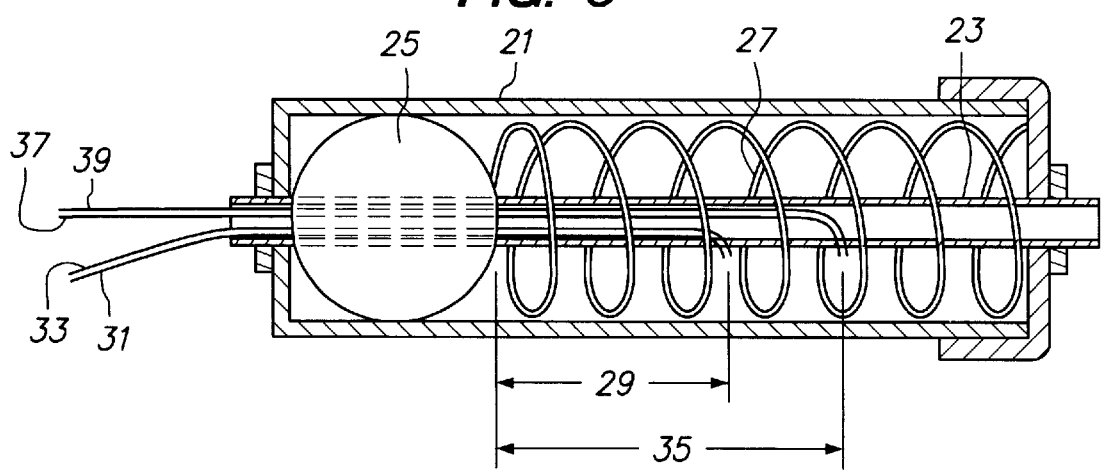
FIG. 3 illustrates an alternative large inertial switch which overcomes limitations of the smaller conventional inertia switch.

Although conventional small inertial switches such as those illustrated in FIG. 2 operate effectively, the preferred embodiment of the present invention incorporates larger inertia switches such as those illustrated in FIG. 3. There are three reasons for incorporating larger inertial switches. The first reason is that larger switches can more easily incorporate two or more thresholds. This allows one switch to activate at different thresholds. For example, when a first threshold is reached the switch can activate a first circuit (i.e. the "severe braking alert" circuit). When a second threshold is reached the switch can activate a second circuit (i.e. the "air bag activation alert" circuit).

The second reason is that larger switches can function as rheostats, potentiometers, or linear voltage differential transducers which output a dynamic signal indicating the deceleration rate of the vehicle. Optionally, this information can be displayed on the vehicle's dashboard. This allows the driver to see a dynamic visual display of her deceleration force. The moving mass in the switch slides along a resistance to create the changing output. A linear displacement transducer with its own power supply and a stroke arm that slides with the moving mass can also be used to provide the changing output.

Furthermore, using the output from the switch, the deceleration force can be visually displayed to trailing drivers by means of a row of lights or a lighted number on the rear of the decelerating vehicle. In order to prevent the premature display of these lights, they can be configured to display only after a certain braking deceleration threshold is reached.

The third reason for using larger switches is that they can more easily be incorporated into the radial swinging switch and the pendulum arm mounted switch which were discussed above. Larger switches may also provide greater accuracy and reliability.

FIG. 3 illustrates the different elements of an example large inertial switch. This large switch comprises a canister enclosure 21 having a horizontal hollow rod 23, along which mass 25 slides against the resistance of spring 27. Mass 25 is made of any electrically conducting metal. Inside the hollow rod 23 is a first pair of wires 31 and 33 and a second pair of wires 37 and 39. When the deceleration force causes mass 25 to slide distance 29, the mass 25 serves as a bridge to complete the circuit between input wire 31 and output wire 33, thereby activating the circuit and signaling that a threshold level has been reached. Similarly, when mass 25 slides distance 35, the mass 25 serves as a bridge to complete the circuit between input wire 37 and output wire 39. This activates a second circuit and signals that a second threshold has been reached.

By providing a narrow longitudinal slot along the bottom of rod 23, the ends of wires 31 and 37 can be positioned anywhere along the slot. In this way the switch can be set to activate at any number of points or when any number of deceleration forces occur. The switch of FIG. 3 can be constructed using a spring in compression or in extension or using an elastic band.

Figure 5:
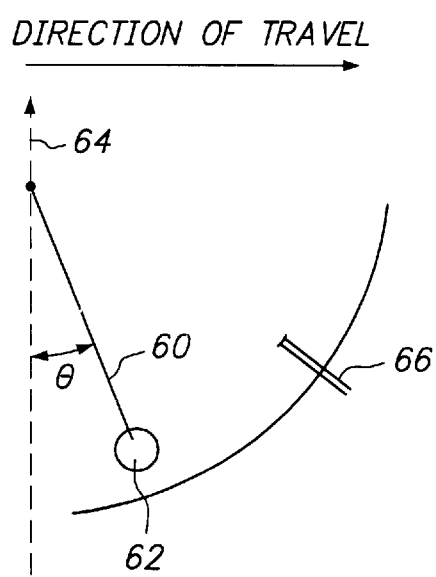
FIG. 5 illustrates an example of a pendulum switch.

An alternative approach is to incorporate a pendulum switch as illustrated in FIG. 5. Here, a pendulum is formed from a hanging arm 60 and a mass 62. The hanging arm normally rests in a vertical position parallel to a vertical axis 64. As the vehicle decelerates, inertia maintains the pendulum moving in the direction of the vehicle's travel. This creates an angle θ between the vertical axis 64 and the hanging arm 60. The greater the deceleration of the vehicle, the greater the angle θ will be. The pendulum can be one electrical lead with another electrical lead 66 located along the path of the pendulum's travel. When the pendulum contacts the second lead 66, the circuit is completed and the vehicle's lights may flash. The movement of the pendulum is analogous to movement of mass 25.

A benefit of the large switch illustrated in FIG. 3 is that it can be made to function as a rheostat, potentiometer, or linear voltage differential transducer by having a resistance positioned along rod 23 and having the sliding mass 25 complete circuits to conduct different current values. The magnitude of the current will be proportional to the deceleration force and will be converted into a display on the rear of the vehicle in the form of a varying row of illuminated lights or a changing illuminated number. A corresponding display can also be located on the vehicle's dashboard for use by the driver.

In order to prevent premature illumination of these lights (i.e. for low deceleration forces), the switch is not activated until a certain braking deceleration threshold is reached. For example, by positioning a rheostat resistance on the rod 23 beginning at distance 29 and extending to distance 35, the rheostat will not be activated until mass 25 slides to distance 29 (see in FIG. 3). Prior to this occurrence the display lights will not illuminate. The circuitry including the rheostat and related display lights can be independent of the circuit for the severe braking alert or it can share components, such as the battery.

To select an appropriate size for spring 27, the force exerted against the spring 27 by the mass 25 when the threshold deceleration rate is exceeded must be calculated. By way of illustration, a threshold deceleration rate of 1 G or 32.2 ft/sec/sec and a mass of 1/16 pound or 1 ounce will be used.

By definition one poundal is a unit of force equal to the force that would give a 1 lb free mass an acceleration of 1 ft/sec/sec. Using the formula:

$$\text{Force} = \text{mass} \times \text{acceleration}; \tag{1}$$

we get:

$$1 \text{ poundal} = 1 \text{ lb mass} \times 1 \text{ ft/sec/sec}; \tag{2}$$

therefore, $$32.2 \text{ poundals} = 1 \text{ lb} \times 32.2 \text{ ft/sec/sec}; \tag{3}$$

or $$32.2 \text{ poundals} = 1 \text{ lb} \times 1 \text{ G} \tag{4}$$

From conversion tables we find that 1 poundal equals a 0.0310810 pound force.

Therefore:

$$0.0310810 \times 32.2 \text{ poundals} = 1 \text{ pound force}; \tag{5}$$

or $$1 \text{ pound force} = 1 \text{ lb} \times 1 \text{ G}; \tag{6}$$

and $$1/16 \text{ pound force} = 1 \text{ ounce force} = 1 \text{ ounce mass} \times 1 \text{ G}. \tag{7}$$

In other words, decelerating a 1 oz weight at the rate of 1 G will exert a 1 oz force on the spring.

The next step is to determine the distance that the selected spring will depress by applying a 1 oz force. By determining when 1 oz weight depresses the spring beyond that distance, it can be determined when the threshold rate of 1 G has been exceeded by the vehicle. To determine this distance an appropriate spring must first be selected.

Springs are rated in pounds per inch. This means, for example, that a spring with a rating of 1 pound per inch will depress 1 inch when a force of 1 lb is applied to the end. Although many different springs will work with the present invention, for illustrative purposes, a spring with the following characteristics will be discussed:

Outside diameter: 0.515 inches

Free length: 1.5 inches

Rating: 0.08 pounds/inch (1.28 oz/inch)

Suggested max. deflection: 1.4 inches

Suggested max. load: 0.11 pounds

Fully depressed length: 0.15 inches

Therefore, a 1 oz force will depress the spring (1 ounce/1.28 ounces)×1 inch=0.78 inch or $25/32$ inch. In other words, when the 1 ounce weight causes the spring to depress more than $25/32$ inches, the threshold deceleration rate has been exceeded and the severe braking alert will be activated.

From the spring rating data above, it is further illustrated that neither the suggested maximum load nor the suggested maximum deflection will be exceeded with this application. This particular spring has a stock number of 10809 and can be found on page 115 of volume 68 of the Century Spring Corporation catalogue.

Regardless of how springs are rated, in actuality they are at best approximations. Therefore, final selection of an appropriate spring will require verifying the spring constant through calibration. Also, to simplify this discussion, a massless spring and zero friction have been assumed. In actuality, however, determining how far the spring will depress depends on the mass of the spring and different frictional forces. These calculations, however, can be easily made by one skilled in the art.

The above example illustrates that in order to activate the severe braking alert, a deceleration rate greater than 1 G must be maintained until the 1 oz weight travels beyond the $25/32$ inch distance. By using calculus or through trials, it can be shown that the time for this to occur is a small fraction of a second. This means that the delay from when the threshold deceleration rate is exceeded to when the severe braking alert is activated is very short and for all practical purposes is negligible.

Figure 4:
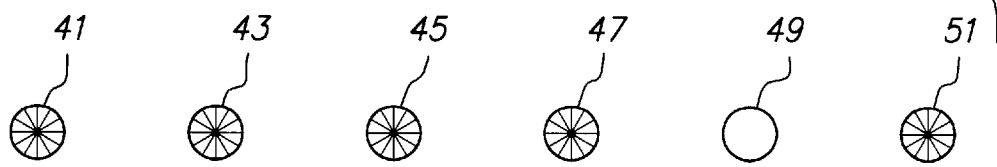
FIG. 4 illustrates an example light scale that can be located at the rear of vehicles.

FIG. 4 illustrates an example display for mounting to the rear of a vehicle. Assuming the deceleration threshold of the rheostat is 0.5 G, when a deceleration force of 0.5 G occurs, both lights 41 and 51 illuminate. These two lights define the two ends of the deceleration scale and might have a greater brightness than the other lights in the row. Illuminated light 41 indicates that a deceleration force of at least 0.5 G has been reached. Illuminated light 51 indicates the location of the upper point on the scale (i.e. 1 G). It is assumed the trailing drivers will be aware of the rating system for the end point lights 41 and 51 through standardization of the rating system.

When a trailing driver, for example, sees that lights 41, 43, 45, 47 and 51 are illuminated, but not light 49, the driver can estimate the deceleration force is about 0.8 G by interpreting the linear scale of lights. Taking into account the weather and road conditions, the trailing driver can judge how precarious the situation is and how to react to it.

When a vehicle brakes and then goes into a skid, there is normally a sudden drop in deceleration force as the skid begins. Trailing drivers who see a sudden drop on the light scale of the vehicle ahead will therefore be alerted to the possibility of a skid.

Instead of a row of lights, a number formed from light-emitting diodes (LEDs) or illuminated numbers can also be displayed at the rear of the decelerating vehicle. For example, 0.8 can signify 0.8 G of force.

Other methods can be used to provide the input signal to the display other than a rheostat, potentiometer, linear voltage differential transducer and linear displacement transducer. For example, FIG. 3 illustrates two threshold points. However, there can just as easily be more threshold points by adding additional wire pairs. The different threshold points on the rod 23 can be configured to correspond to incremental increases in G forces on the switch. Yet another important approach is to use a different inertia switch for each of the five threshold points. The strip or row of lights can consist of any number of lights since there can be any number of threshold points. Still another method for providing an input signal to the display is to use a conventional accelerometer with its own power supply to create the changing output.

The severe braking alert with its flashing red light can be designed to activate at the same time the strip of lights are illuminated (i.e. at the same time that light 41 illuminates). The severe braking alert can also be configured to activate at any point along the strip of lights when a specific light illuminates. For example, the severe braking alert can be configured to activate at 0.8 G which is when light 47 illuminates. This activation could be the result of using the same inertia switch that causes light 47 to illuminate or it could be the result of using a different inertia switch.

Instead of having light 51 illuminate to show the end of the scale when light 41 illuminates, other means could be used. For example, an illuminated rectangular frame or line could be used to indicate the end points of the scale.

The length of the light scale can be approximately one to three feet with one end of the light scale representing a 0.5 G deceleration force and the other end representing a 1 G deceleration force, for example. It is important that the end points represent standardized G forces so that anyone can interpret the meaning of the illuminated lights on the scale. The light scale should also be constructed so that as each light illuminates, its hue does not extend upscale but only downscale, thereby giving a clear demarcation and indication of the G force level. Furthermore, the light scale can be vertical, horizontal or at any angle and it can be most any shape, including a circle.

While the present invention can be provided as an independent system, it is further contemplated that the present invention be integrated with existing safety systems. As discussed above, the present invention is designed to alert trailing drivers when a lead vehicle experiences an unsafe condition. In addition to severe braking, the present invention also contemplates other unsafe conditions which can trigger the alert system. For example, the present invention can be integrated with air bag systems wherein activation of the vehicle's airbag sensor (i.e. due to a collision) will simultaneously trigger the flashing lights of the present invention. In other words, the same sensor that senses a collision and deploys the air bag can be used to trigger the sensor and/or signaling device of the present invention. It should be noted that it is not the deployment of the air bag that necessarily activates the present invention (although this is possible), rather, it is the air bag's sensor that activates the present invention. This allows the present invention to incorporate the air bag's sensor even if the airbag is disabled and does not deploy.

To allow for side air bags, two additional switches or a radial inertial switch can be added in parallel that are oriented to sense side impact forces. The air bag activation can also be detected by devices that measure noise from the bag's explosive charge, smoke from the spent charge, and air pressure changes due to the inflating bag.

Because air bag detection circuits are well known in the art, a detailed discussion of their design is not provided.

Integrating the present invention with air bag systems is a logical combination because air bags only deploy when a vehicle collides with something and comes to a sudden, unexpected stop. The resulting accident may well result in subsequent rear-end collisions if trailing drivers are not alerted. If the lead vehicle's conventional electrical system fails due to the accident, the oncoming drivers might not be able to see the damaged vehicle (e.g. when it is dark). The present invention can be helpful under these conditions when a separate battery is used to power the present invention. By signaling air bag activation, the configuration also reminds others that help or rescue may be required. The lights can be permitted to flash for up to ten minutes after activation unless turned off sooner.

According to the present invention, the alert can be a separate circuit, or it can be combined with the SBA circuitry by adding another inertia switch and a time delay relay to enable sustained flashing while the battery and flasher unit can be shared.

It is also contemplated that the present invention can be integrated with handling control systems which are usually activated during an unsafe event. For example, handling control systems (HCS) include Anti-lock Braking Systems (ABS), Traction Control Systems and other systems that automatically control braking and/or engine power for safety purposes. The present invention can be incorporated with these handling control systems so that the flashing lights activate in response to activity by a particular-handling control system. For example, ABS systems typically use wheel sensors that create an alternating current transmitted to a processor as a sine wave. Each cycle of the sine wave represents a revolution of the wheel. By analyzing the frequency of the revolutions over time, the processor determines when a wheel is about to lock-up and then sends a correction command for the brake on that particular wheel to release.

The present invention contemplates that the correction command from the ABS be used to also activate the severe braking alert of the present invention. The present invention can be activated by a correction command current or by movement of the ABS solenoid valves. Similarly, engine power correction commands can also activate the alert. The present configuration can also be designed to recognize a particular type of corrective command. For example, it might only activate when ABS commands are given.

As discussed above with regard to air bags, handling control systems such as ABS systems are well known in the art. Therefore a detailed discussion of their design is not provided.

Coupling the present invention with handling control systems is beneficial because handling control systems usually only send correction commands when a hazardous condition exists. Keep in mind, there is no assurance that the correction command will overcome the hazard. It is still very possible that an accident will result. Therefore, trailing drivers should be notified that a correction command has been given by the lead vehicle. This warns the trailing driver of an unsafe situation and informs her that the lead driver has exceeded the limits of safe driving, at least momentarily.

It is still further contemplated that the present invention be configured to respond to a driver "stomping" on the brake pedal which is also considered an unsafe occurrence. In this embodiment, the present invention is designed as a severe brake pedal impact alert. This provides an alert signal (i.e. flashing lights) when the driver forcefully strikes the brake pedal with a sharp force of a predetermined magnitude. The alert can be a flashing light or lights at the rear of the vehicle that continue to flash for a predetermined time period (i.e. 3 seconds) after severely stepping on the vehicle's brake pedal. The alert can be the same flashing alert as the alert signal described above or can incorporate other flashing patterns. The severe brake pedal impact alert can be a separate circuit or combined with the severe braking alert circuitry described above by adding an inertial switch. The inertial switch can be activated by severe impact on the brake pedal by the driver's foot. The severe brake pedal impact alert can incorporate the same circuit illustrated in FIG. 1 except that the switch 9 can be an inertial switch positioned on the brake pedal arm or connected mechanisms and oriented to sense the impact of the driver's foot on the brake pedal.

This configuration is an excellent approach for warning trailing drivers of sudden braking that may or may not result in a deceleration rate in excess of the selected threshold that would activate the severe braking alert described above.

The present invention can also be incorporated into a vehicle's hazard lights which are activated when a driver pushes, taps or strikes an alert switch to notify other drivers of a hazardous condition. The alert switch is distinct from a vehicle's conventional hazard light switch in that it is conveniently located on the dashboard, steering wheel or elsewhere for fast access. Furthermore, activating the alert switch results in the lights flashing for a predetermined time period before automatically deactivating or switching off.

The alert is a flashing light or lights at the rear and/or front of the vehicle that continues to flash for, say, 3 seconds after activation. The alert can be the same flashing alert as described above or can be other flashing lights such as the flashing amber emergency lights. The alert can be a separate circuit or combined with the circuitry of the present invention by adding the button switch in parallel to the inertial switch 9.

The hazardous condition alert system can be activated to alert trailing drivers of hazardous conditions ahead, such as a dog, debris or a chemical spill on the road. This advance warning will enable the trailing drivers to be more prepared to respond appropriately, thereby reducing the potential for mishaps, especially rear end accidents.

Using the flashing amber turn signal lights or emergency lights as the alert will also attract the attention of approaching drivers. This will be useful for indicating that the lead vehicle is skidding out of control or experiencing a hazardous condition. Currently, many drivers pump their brakes rapidly to signal trailing drivers of a hazardous condition. The hazardous condition alert configuration simplifies this process. The lead driver need only to tap a button to deliver such an alert, allowing her to concentrate more fully on the road ahead and her own driving responses.

It is also contemplated that the present invention be coupled with existing alarm systems to defeat theft and carjacking of the vehicle. For example, the present invention can be designed to activate whenever the vehicle is carjacked. For example, the activating event can be, although is not limited to, the driver pressing a hidden switch. The alert would be a flashing light(s) at the rear and/or front of the vehicle that starts to flash a predetermined time period after the switch is activated (i. e. anywhere from immediately to after 5 minutes) and continues to flash for a predetermined time period (i.e. 15 minutes), unless turned off sooner. The switch can also be re-activated for another 15 minutes of flashing. The benefit of delaying the lights from flashing is that it allows the victim to escape in the meantime.

The present invention can still further be incorporated with a vehicle's theft alarm system so that unauthorized entry into the vehicle or "hot-wiring" of the vehicle's engine will activate the flashing lights and/or horns.

Typical alarm systems provide a switch which opens each time the vehicle is properly started with a key. However, when the vehicle is "hot wired" or detects an unauthorized entry, the switch remains closed and the alarm's circuitry is activated. The present invention can be configured to respond to the vehicle's anti-theft alarm to activate the severe braking alert. Furthermore, the time delay relay, if used, can be configured to start the lights flashing after a predetermined time period (i.e. 5 minutes) after the alert condition. This increases the likelihood of the thief not noticing the alert until he has started to drive away with the stolen car and in the middle of the street or an intersection. The alarm can incorporate a unique pattern including rapid flashing, slow flashing or alternating side to side flashing. A horn can also be integrated. Regardless of the alarm types, however, the purpose of this configuration is to draw attention to the vehicle so authorities can apprehend the thief and recover the vehicle or, when a horn is used, to encourage the thief to abort the theft.

As discussed above with regard to air bags, anti-theft alarms are well known in the art. Therefore a detailed discussion of their design is not provided.

It is particularly beneficial to combine the present invention with vehicle alarm systems as vehicle thefts are frequent and costly. The unique advantage of this configuration is that it can activate shortly after the theft has occurred so, hopefully, will not to be noticed by the thief. Alternatively, the alert can include a blaring horn which activates after the theft has occurred and while the thief is driving. Indeed, such a situation is often likely to cause the theft to be aborted due to the element of surprise and inability of the thief to defeat the alarm in the middle of the street.

Additionally, this alert can be used with conventional vehicle alarms and protections, such as the CLUB security device, which certainly are not always deterrents.

I claim:

1. An alert system coupled to a vehicle for notifying trailing drivers that the vehicle has experienced a severe braking condition, the system comprising:

an alert sensor for detecting a deceleration rate in excess of a predetermined value, wherein the alert sensor is an inertial switch comprising:
an enclosure having a first end and a second end,
a hollow rod extending through the enclosure and affixed thereto at both the first end and the second end,
at least one pair of conductive wires positioned within the hollow rod with respective ends thereof extending outside of the hollow rod to provide a normally open contact in a predetermined location on an external surface of the hollow rod, said wires completing a circuit for the signaling device,
a conductive mass coupled to the hollow rod and freely movable along the hollow rod, and
a spring arranged about the hollow rod to provide resistance to the movement of the conductive mass, said spring adapted to compress over a range including the predetermined value, wherein deceleration of the vehicle in excess of the predetermined value causes the conductive mass to compress the spring and move along the hollow rod to the predetermined location,
whereupon the normally open contact is closed by the mass and the signaling device is activated; and
a signaling device positioned facing rearward from the vehicle and having a flashing light responsive to the alert sensor.

* * * * *